(12) United States Patent
Hachtmann et al.

(10) Patent No.: US 9,604,733 B2
(45) Date of Patent: Mar. 28, 2017

(54) SYSTEMS AND METHODS FOR A WINCH DRUM AND DRUM DOOR

(71) Applicant: X Development LLC, Mountain View, CA (US)

(72) Inventors: Brian Hachtmann, San Martin, CA (US); Gabe Murphy, Mountain View, CA (US); Damon Vander Lind, Alameda, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 338 days.

(21) Appl. No.: 14/144,103

(22) Filed: Dec. 30, 2013

(65) Prior Publication Data
US 2015/0183529 A1    Jul. 2, 2015

(51) Int. Cl.
*B64F 3/00* (2006.01)
*B66D 1/30* (2006.01)

(52) U.S. Cl.
CPC . *B64F 3/00* (2013.01); *B66D 1/30* (2013.01)

(58) Field of Classification Search
CPC ... B66D 1/30; B66D 1/34; B66D 1/60; B66D 1/52; B66D 3/26; B65H 75/28; B64F 3/00; B64F 3/02; B64F 1/12; B64C 39/022; B64C 31/06; F03D 9/20; F03D 9/25; F03D 5/04; F03D 9/002; F03D 13/20
See application file for complete search history.

(56) References Cited

U.S. PATENT DOCUMENTS

| | | | | |
|---|---|---|---|---|
| 2,053,976 A | * | 9/1936 | Stahl | B62D 43/045 242/602.2 |
| 3,493,105 A | * | 2/1970 | Greb | B65H 75/141 206/401 |
| 5,312,061 A | * | 5/1994 | McCormick | B65H 75/28 242/586.2 |
| 2010/0013236 A1 | * | 1/2010 | Carroll | B64C 39/022 290/55 |
| 2010/0230546 A1 | | 9/2010 | Bevirt et al. | |
| 2011/0121570 A1 | | 5/2011 | Bevirt et al. | |
| 2013/0140827 A1 | | 6/2013 | Carroll | |
| 2013/0221679 A1 | | 8/2013 | Vander Lind | |
| 2013/0285377 A1 | | 10/2013 | Tattersfield et al. | |

* cited by examiner

*Primary Examiner* — Sang Kim
*Assistant Examiner* — Nathaniel Adams
(74) *Attorney, Agent, or Firm* — McDonnell Boehnen Hulbert & Berghoff LLP

(57) ABSTRACT

Wind energy systems, such as an Airborne Wind Turbine ("AWT"), may be used to facilitate conversion of kinetic energy to electrical energy. An AWT may include an aerial vehicle that flies in a path, such as a substantially circular path, to convert kinetic wind energy to electrical energy. The aerial vehicle may be coupled to a winch assembly via a tether. The winch assembly may include a winch drum and a drum door. The winch assembly may be configured such that the drum door may operate in two or more positions, such as an open position and a closed position, to reduce the likelihood of stability problems occurring at the aerial vehicle during winding or unwinding of the tether.

10 Claims, 10 Drawing Sheets

SYSTEMS AND METHODS FOR A WINCH DRUM AND DRUM DOOR

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

The present disclosure generally relates to systems and methods that incorporate a ground station for tethering aerial vehicles, such as those ground stations employed in crosswind aerial vehicle systems. Crosswind aerial vehicle systems may extract useful power from the wind for various purposes such as, for example, generating electricity, lifting or towing objects or vehicles, etc. Deploying and receiving the aerial vehicles to generate power may present difficulties due to, for example, changing wind conditions and/or turbulent wind conditions. Beneficially, embodiments described herein may allow for more reliable, safe, and efficient deployment and reception of aerial vehicles. These as well as other aspects, advantages, and alternatives will become apparent to those of ordinary skill in the art by reading the following detailed description, with reference where appropriate to the accompanying drawings.

In one aspect, a winch assembly is provided. The winch assembly may include a drum that is rotatable about a central axis. The drum may include an exterior winding surface having an aperture through the exterior winding surface and a drum door having a drum door exterior surface. The drum door may be configured for two or more positions. A first drum door position may be a closed drum door position where the drum door covers the aperture and the shape of the drum door exterior surface substantially corresponds to the shape of the exterior winding surface surrounding the aperture. A second drum door position may be an open drum door position revealing the aperture. The winch assembly may include a port that is configured to provide access to the interior drum cavity and to allow a first portion of the main tether body to exit the interior drum cavity via the port. The winch assembly may include a tether with a proximate tether end, a main tether body, and a distal tether end. The proximate tether end may be located within the interior drum cavity. The winch assembly may include a gimbal mount attached to the drum that constrains a second portion of the tether. The drum may be configured such that rotating the drum about its central axis in a first direction causes the main tether body to wind onto the drum and rotating the drum about its central axis in a second direction causes the main tether body to unwind from the drum.

In one aspect, a method is provided. The method may include positioning a proximate end of a tether within an interior cavity of a winch drum and routing the tether to an exterior winding surface of the winch drum through a port. The method may include attaching a distal tether end to an external load and tensioning the tether between the winch drum and the external load via the external load. The method may include rotating the winch drum about a central axis in a first direction. The rotation may cause the tensioned tether to wind around the external winding surface, causing the tensioned tether to contact and apply pressure to an open drum door, and in turn causing the open drum door to close. The closed drum door may be configured to cover a portion of an aperture in the external winding surface.

In one aspect, a system is provided. The system may include a drum that is rotatable about a central axis. The drum may include an exterior winding surface having an aperture through the exterior winding surface and a drum having a drum door exterior surface. The drum door may be configured for two or more positions. A first drum door position may be a closed drum door position that covers the aperture and where the shape of the drum door exterior surface substantially corresponds to the shape of the exterior winding surface surrounding the aperture. A second drum door position may be an open drum door position revealing the aperture. The system may include a port configured to provide access to an interior drum cavity. The system may include a tether with a proximate tether end, a main tether body, and a distal tether end. The proximate tether end may be located within the interior drum cavity, and the distal tether end may be connected to an aerial vehicle. A first portion of the main tether body may exit the interior drum cavity through the port. The system may include a gimbal mount attached to the drum where the gimbal mount constrains a portion of the tether. The system may also include a drum drive assembly attached to the drum and configured to rotate the drum. The drum drive assembly may include a motor and a drum drivetrain that is connected to the motor and the drum. The drum may be configured such that rotating the drum about its central axis in a first direction causes the main tether body to wind onto the drum and rotating the drum about its central axis in a second direction causes the main tether body to unwind from the drum.

DETAILED DESCRIPTION

Figure 1:
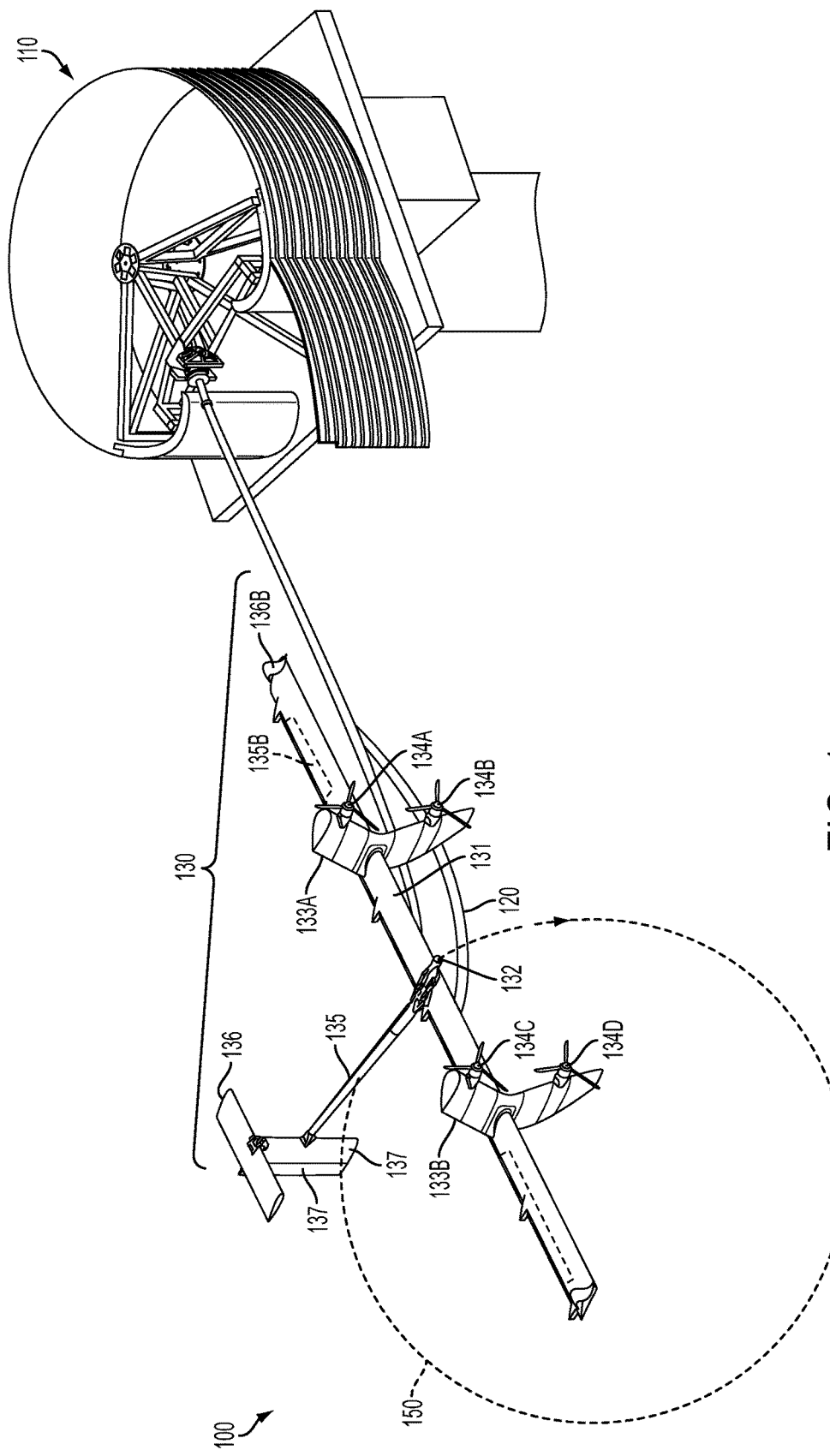
FIG. 1 illustrates an Airborne Wind Turbine (AWT), according to an example embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Example embodiments relate to aerial vehicles, which may be used in a wind energy system, such as an Airborne Wind Turbine (AWT). In particular, example embodiments may relate to or take the form of methods and systems for facilitating an aerial vehicle in the process of conversion of kinetic energy to electrical energy.

By way of background, an AWT may include an aerial vehicle that flies in a path, such as a substantially circular path, to convert kinetic wind energy to electrical energy via onboard turbines. In an example embodiment, the aerial vehicle may be connected to a ground station via a tether. While tethered, the aerial vehicle may: (i) fly at a range of elevations and substantially along the path, and return to the ground, and (ii) transmit electrical energy to the ground station via the tether. In some embodiments, the ground station may transmit electricity to the aerial vehicle for take-off and/or landing.

In an AWT, an aerial vehicle may rest in and/or on a ground station when the wind is not conducive to power generation. When the wind is conducive to power generation, such as when a wind speed may be 10 meters per second (m/s) at an altitude of 200 meters (m), the ground station may deploy (or launch) the aerial vehicle. In addition, when the aerial vehicle is deployed and the wind is not conducive to power generation, the aerial vehicle may return to the ground station.

Moreover, in an AWT, an aerial vehicle may be configured for hover flight and crosswind flight. Crosswind flight may be used to travel in a motion, such as a substantially circular motion, and thus may be the primary technique that is used to generate electrical energy. Hover flight in turn may be used by the aerial vehicle to prepare and position itself for crosswind flight. In particular, the aerial vehicle could ascend to a location for crosswind flight based at least in part on hover flight. Further, the aerial vehicle could take-off and/or land via hover flight.

In hover flight, a span of a main wing of the aerial vehicle may be oriented substantially parallel to the ground, and one or more propellers of the aerial vehicle may cause the aerial vehicle to hover over the ground. In some embodiments, the aerial vehicle may vertically ascend or descend in hover flight.

In crosswind flight, the aerial vehicle may be propelled by the wind substantially along a path, which as noted above, may convert kinetic wind energy to electrical energy. In some embodiments, the one or more propellers of the aerial vehicle may generate electrical energy by slowing down the incident wind.

The aerial vehicle may enter crosswind flight when (i) the aerial vehicle has attached wind-flow (e.g., steady flow and/or no stall condition (which may refer to no separation of air flow from an airfoil)) and (ii) the tether is under tension. Moreover, the aerial vehicle may enter crosswind flight at a location that is substantially downwind of the ground station.

Some previous tethered systems have used a varying length tether. An example embodiment, in contrast, facilitates the use of a fixed length tether. For example, a fixed length tether may be approximately 500 meters long and approximately 20 millimeters in diameter. The tether may include one or more conductors to transmit electrical energy, or other electrical signals, along the tether length.

A tether termination mount at the ground station may be desirable for various reasons. For example, the aerial vehicle in cross-wind flight may oscillate many times over the life of the system (foe e.g., 30 million cycles of aerial vehicle and tether rotation) so a tether termination mount may be desirable that does not wear, or rub, the tether. In the case of rigid or semi-rigid tethers, a tether termination mount may be desirable that does not impart significant bending loads onto the tether.

In the case of a tether with one or more conductors, a tether termination mount may be desirable that does not accumulate twists in the tether. Tether twisting may be a problem because a twisted tether may have reduced conductivity due to the twisting or eventual breaking of the conductor(s). For example, the tether termination mount may either actively or passively rotate to align the tether at the ground-side system with the motion of the aerial vehicle. The tether termination mount may include a servomotor or other drive mechanism to manually rotate the tether and reduce the likelihood of significant tether twisting. Additionally in the case of a tether with one or more conductors, a tether termination mount may be desirable that communicates power either into the ground side system or out to the aerial vehicle.

II. Illustrative Systems

A. Airborne Wind Turbine (AWT)

FIG. 1 depicts an AWT 100, according to an example embodiment. In particular, the AWT 100 includes a ground station 110, a tether 120, and an aerial vehicle 130. As shown in FIG. 1, the aerial vehicle 130 may be connected to the tether 120, and the tether 120 may be connected to the ground station 110. In this example, the tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while transitioning between hover and crosswind flight. In some implementations, a ground station 110 may be configured for use on land. However, a ground station 110 may also be implemented on a body of water, such as a lake, river, sea, or ocean. For example, a ground station could include or be arranged on a floating off-shore platform or a boat, among other possibilities. Further, a ground station 110 may be configured to remain stationary or to move relative to the ground or the surface of a body of water.

In addition, the ground station 110 may include one or more components (not shown), such as a winch, that may vary a length of the tether 120. Such components will be described in greater detail later in this disclosure. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters. However other lengths may be used as well.

The aerial vehicle 130 may be configured to fly substantially along a path 150 to generate electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be used in the formation of aerial vehicle as well.

The path 150 may be various different shapes in various different embodiments. For example, the path 150 may be substantially circular. And in at least one such example, the path 150 may have a radius of up to 265 meters. The term "substantially circular," as used in this disclosure, refers to exactly circular and/or one or more deviations from exactly circular that do not significantly impact generation of electrical energy as described herein. Other shapes for the path 150 may be an oval, such as an ellipse, the shape of a jelly bean, the shape of the number of 8, etc.

As shown in FIG. 1, the aerial vehicle 130 may include a main wing 131, a front section 132, rotor connectors 133A-B, rotors 134A-D, a tail boom 135, a tail wing 136, and a vertical stabilizer 137. Any of these components may be shaped in any form which allows for the use of components of lift to resist gravity and/or move the aerial vehicle 130 forward.

The main wing 131 may provide a primary lift for the aerial vehicle 130. The main wing 131 may be one or more rigid or flexible airfoils, and may include various control surfaces, such as winglets, flaps, rudders, elevators, etc. The control surfaces may be used to stabilize the aerial vehicle 130 and/or reduce drag on the aerial vehicle 130 during hover flight, forward flight, and/or crosswind flight.

The main wing 131 may be any suitable material for the aerial vehicle 130 to engage in hover flight, forward flight, and/or crosswind flight. For example, the main wing 131 may include carbon fiber and/or e-glass. Moreover, the main wing 131 may have a variety dimensions. For example, the main wing 131 may have one or more dimensions that correspond with a conventional wind turbine blade. As another example, the main wing 131 may have a span of 8 meters, an area of 4 meters squared, and an aspect ratio of 15. The front section 132 may include one or more components, such as a nose, to reduce drag on the aerial vehicle 130 during flight.

The rotor connectors 133A-B may connect the rotors 134A-D to the main wing 131. In some examples, the rotor connectors 133A-B may take the form of or be similar in form to one or more pylons. In this example, the rotor connectors 133A-B are arranged such that the rotors 134A-D are spaced between the main wing 131. In some examples, a vertical spacing between corresponding rotors (e.g., rotor 134A and rotor 134B or rotor 134C and rotor 134D) may be 0.9 meters.

The rotors 134A-D may be configured to drive one or more generators for the purpose of generating electrical energy. In this example, the rotors 134A-D may each include one or more blades, such as three blades. The one or more rotor blades may rotate via interactions with the wind and which could be used to drive the one or more generators. In addition, the rotors 134A-D may also be configured to provide a thrust to the aerial vehicle 130 during flight. With this arrangement, the rotors 134A-D may function as one or more propulsion units, such as a propeller. Although the rotors 134A-D are depicted as four rotors in this example, in other examples the aerial vehicle 130 may include any number of rotors, such as less than four rotors or more than four rotors that may be spaced along main wing 131.

The tail boom 135 may connect the main wing 131 to the tail wing 136. The tail boom 135 may have a variety of dimensions. For example, the tail boom 135 may have a length of 2 meters. Moreover, in some implementations, the tail boom 135 could take the form of a body and/or fuselage of the aerial vehicle 130. And in such implementations, the tail boom 135 may carry a payload.

The tail wing 136 and/or the vertical stabilizer 137 may be used to stabilize the aerial vehicle and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. In this example, the vertical stabilizer 137 is attached to the tail boom 135, and the tail wing 136 is located on top of the vertical stabilizer 137. The tail wing 136 may have a variety of dimensions. For example, the tail wing 136 may have a length of 2 meters. Moreover, in some examples, the tail wing 136 may have a surface area of 0.45 meters squared. Further, in some examples, the tail wing 136 may be located 1 meter above a center of mass of the aerial vehicle 130.

While the aerial vehicle 130 has been described above, it should be understood that the methods and systems described herein could involve any suitable aerial vehicle that is connected to a tether, such as the tether 120.

B. Illustrative Components of an AWT

Figure 2:
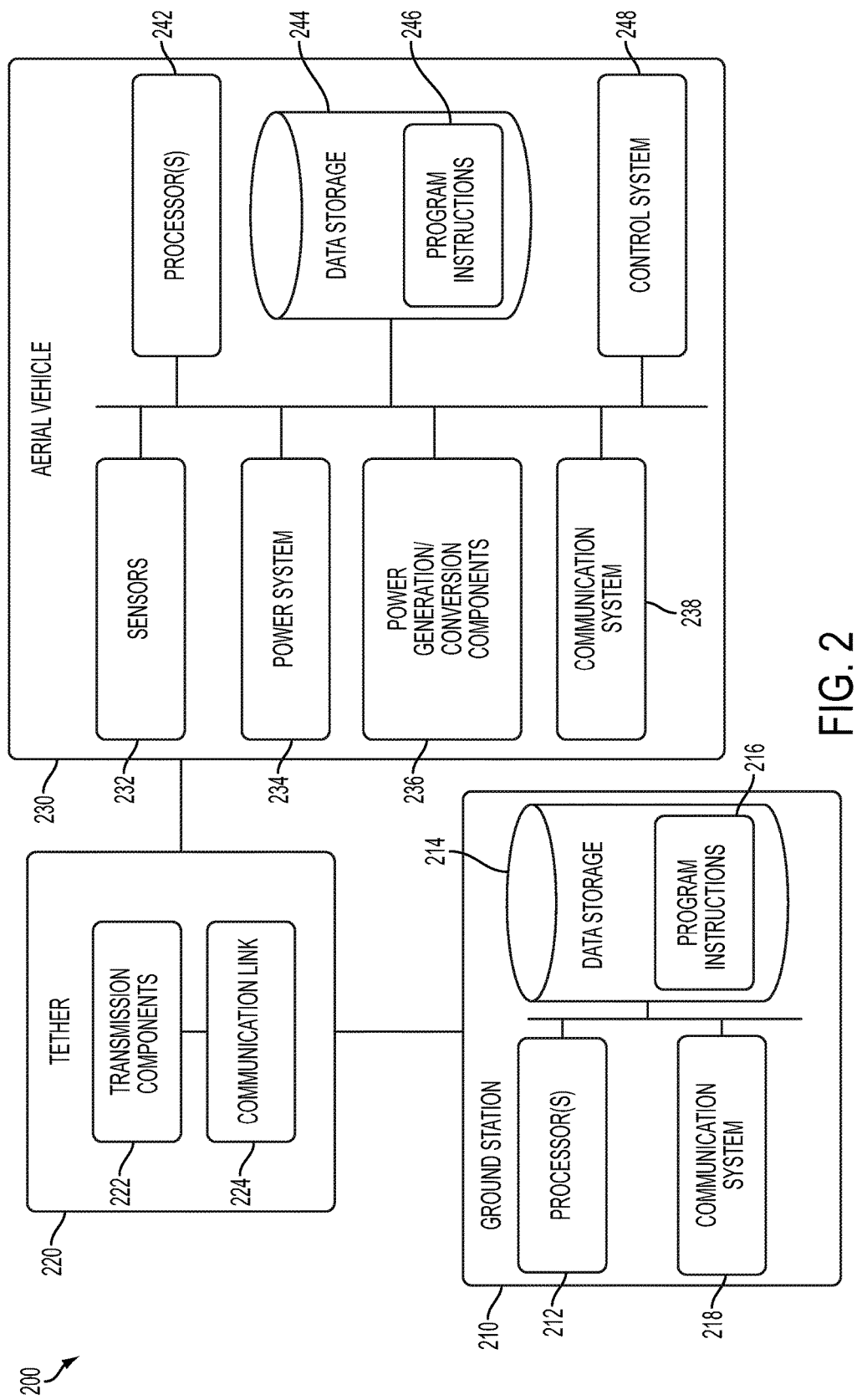
FIG. 2 illustrates a simplified block diagram illustrating components of an AWT, according to an example embodiment.

FIG. 2 is a simplified block diagram illustrating components of the AWT 200. The AWT 200 may take the form of or be similar in form to the AWT 100. In particular, the AWT 200 includes a ground station 210, a tether 220, and an aerial vehicle 230. The ground station 210 may take the form of or be similar in form to the ground station 110, the tether 220 may take the form of or be similar in form to the tether 120, and the aerial vehicle 230 may take the form of or be similar in form to the aerial vehicle 130.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in data storage 214 and are executable to provide at least part of the functionality described herein.

The data storage 214 may include or take the form of one or more computer-readable storage media that may be read or accessed by at least one processor 212. The one or more computer-readable storage media may include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communications system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that may allow for both short-range communication and long-range communication. For example, ground station 210 may be configured for short-range communications using Bluetooth and may be configured for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors that are configured to transmit electricity. And in at least one such example, the one or more conductors may include aluminum and/or any other material which may allow for the conduction of electric current. Moreover, in some implementations, the transmission components 222 may surround a core of the tether 220 (not shown).

The ground station 210 may communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, and program instructions 246, and a control system 248.

The sensors 232 could include various different sensors in various different embodiments. For example, the sensors 232 may include a global a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. For example, vehicle 230 may employ drift mitigation through fault tolerant redundant position and velocity estimations. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 326 could take various different forms in various different embodiments. For example, the power generation/conversion components 236 may include one or more generators, such as high-speed, direct-drive generators. With this arrangement, the one or more generators may be driven by one or more rotors, such as the rotors 134A-D. And in at least one such example, the one or more generators may operate at full rated power in wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable vehicle that is connected to a tether, such as the tether 230 and/or the tether 110.

C. Illustrative Components of a Winch Assembly

Figure 3:
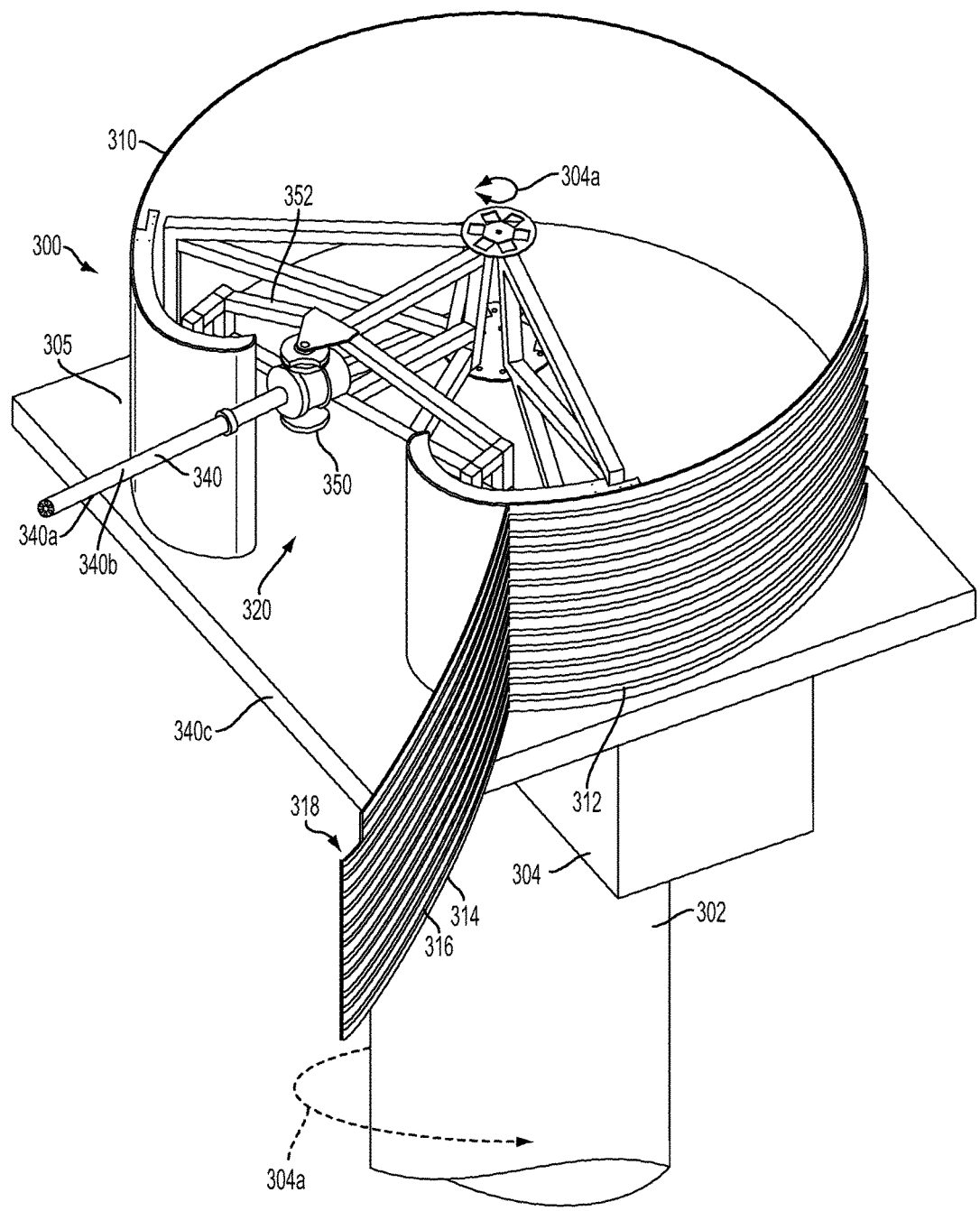
FIG. 3 illustrates a perspective view of a winch assembly, according to an example embodiment.

FIG. 3 illustrates a perspective view of a winch assembly for an aerial vehicle of an AWT, such as the aerial vehicle 130 illustrated in FIG. 1. Winch assembly 300 may be the same or similar to ground station 210 of FIG. 2, or ground station 110 of FIG. 1. FIG. 3 is representational only and not all components are shown. For example, additional structural or restraining components may not be shown.

Winch assembly 300 may include a drum 310 with an exterior winding surface 312 and an aperture 320 through the exterior winding surface, a drum door 314 with a drum door exterior surface 316, a port 318, a tether 340, and a gimbal mount 350. Winch assembly 300 may also include a vertical tower 302, a rotating member 304, a platform 305, and a perch platform 306. Vertical tower 302 and platform 305 may be used to facilitate the perch and launch of an aerial vehicle 330. In some embodiments, platform 305 may be a perch platform 306 upon which an aerial vehicle 330 can perch (e.g., when landing).

Platform 305 may be coupled to winch drum 310. Platform 305 may be coupled to a rotating member 304 and thereby rotatably coupled to vertical tower 302. Via rotating member 304, winch assembly 300, winch drum 310, and platform 305 may rotate around an axis such as around a vertical axis (e.g., rotate in the azimuth plane as representatively shown in FIG. 3 by arrow 304a). Rotating member 304 may be, for example, a passive slewing ring or an active slewing ring with a motor drive. In this manner, platform 305 may be rotated actively or passively around a vertical axis. While disclosed embodiments make use of a slewing ring, any rotational bearing or other configuration may be used that may allow platform 305 to rotate around vertical tower 302. Vertical tower 302 may be a tubular steel structure, although any structure that can resolve aerial flight loads may be used.

A drum drive assembly 302 may be coupled to the winch drum 310 and configured to rotate the winch drum 310, for example, to assist with the taking off and landing of an aerial vehicle 330 in an AWT. The drum drive assembly 302 may include a motor and a drum drivetrain connected to the motor and the winch drum 310.

Tether 340 may be connected to winch assembly 300 via gimbal mount 350 and wound onto winch drum 310 when winch drum 310 rotates. The tether 340 may be guided onto winch drum 310 via a levelwind (not shown). The tether 340 may have a proximate tether end 340a, a main tether body 340b, and a distal tether end. Proximate tether end 340a may be coupled to the gimbal mount 350. Distal tether end 340c may be coupled to an aerial vehicle 330 of an AWT. Tether 340 may include one or more insulated conductors that have a proximate conductor end and a distal conductor end. The proximate conductor end of the one or more insulated conductors may be coupled to the winch assembly. For example, the proximate conductor end of the one or more insulated conductors may be coupled to the gimbal mount 350. The distal conductor end of the one or more insulated conductors may be coupled to the aerial vehicle 330 of an AWT.

The gimbal mount 350 may be coupled to the winch drum 310 in various ways. For example, the gimbal mount may be connected to a support structure 352 that is connected to the winch drum 310. The tether 340 may be guided onto winch drum 310 via a levelwind (not shown).

The aperture 320, or opening in the exterior winding surface 312 of the winch drum 310, may be advantageous to facilitate use of an inset gimbal mount 350. However, the aperture 320 has the potential to contribute to stability problems during deployment or retrieval of the tether 340. For example, the rate at which the tether 340 winds or unwinds may vary as the tether 340 transitions from the exterior surface of the drum to the open area of the aperture.

For example, following takeoff the tether 340 may be deployed at a deployment velocity ($V_D$) equal to the rate at which the tether 340 unwinds from the drum. For a given moment in time and at a given location along the perimeter of the winch drum 310, the deployment velocity ($V_D$) is equal to the revolutions per unit time ($R_T$) of the winch drum 310 multiplied by the effective circumference at that location (e.g., for a cylindrically shaped drum, the effective circumference would be two times the radius from the center of the drum to the center of the tether diameter (R), multiplied by the mathematical constant $\pi$). Thus, $V_D = 2(R)(\pi)*R_T$.

When the tether 340 is unwound across the aperture 320, the tether 340 is not supported by the exterior winding surface 312 of the winch drum 310. As a result, the effective radius R to a portion of the main tether body 340b that is wound across the aperture 320 may become smaller than when the tether 340 is supported by the exterior winding surface 312. Consequently, the effective deployment velocity $V_D$ of the tether 340 can vary as the tether 340 unwinds based on whether a portion of the main tether body 340b that is unwinding is wrapped on the exterior winding surface 312 or over the aperture 320. As a result of this variance in deployment velocity $V_D$, the tether 340 may exhibit a jerking effect, propagating a wave up the tether 340, and contributing to stability problems of the AWT.

A port 318 may be used to allow access to an interior drum cavity from the exterior of the winch drum 310. As illustrated in an example embodiment of FIG. 3, the port 318 may be an opening on the drum door 314 that allows access to an interior drum cavity when the drum door is closed. In a further aspect, the port 318 may be on a portion of the winch drum 310. Other configurations and locations of ports may be used as well.

The drum door 314 may be configured for two or more positions. A first drum door position may be a closed drum door position where the drum door 314 covers the aperture 320. A second drum door position may be an open drum door position where the drum door 314 reveals the aperture 320. Additionally, the shape of the drum door exterior surface 316 may substantially correspond to the shape of the exterior winding surface 312 surrounding the aperture, both in profile and in cross-section. For example, the drum door profile may be curved to match the radius of the exterior wind surface 312. Additionally or alternatively, the exterior winding surface 312 and the drum door exterior surface 316 may include helical grooves and create a substantially continuous helical groove pattern around the winch drum 310 when the drum door 314 is in the closed drum door position.

In an example embodiment, the tether 340 may directly or indirectly act on the drum door 314 to change the drum door position. For example, the tether 340 may act on the drum door 314 to change the drum door 314 from the closed position to the open position. In one embodiment, the tether 340 may be wound around the winch drum 310. The gimbal mount 350 and a portion of the main tether body 340b may be disposed and oriented within the interior cavity of the winch drum 310 in proximity to the drum door 314 when the drum door 314 is in the closed position. Note that FIG. 3 illustrates the drum door 314 in the open position, but other figures provide additional illustrations of a closed door that are relevant to illustrating this configuration.

The tether 340 may access the exterior winding surface 312 through the port 318 as previously described. In this embodiment, the winch drum 310 may rotate and the main tether body 340b may unwind along the exterior winding surface 312 of the winch drum 310. When the last portion of the main tether body 340b unwinds from the exterior winding surface 312 and tension is applied to the tether 340 via the aerial vehicle 330 connected to the distal tether end, the tensioned tether 340 may cause the drum door 314 to move from the closed position to the open position. For example, the tensioned tether 340 may push against the door and cause it to open, either exclusively from the pressure of the tensioned tether 340 against the door, or with assistance from another one or more additional mechanisms such as a compression spring, torsion spring, gas spring, motor, sensor, or other assistive device.

Likewise, in an example embodiment, the tether 340 may act on the drum door 314 to change the drum door 314 from the open position to the closed position. For example, during landing of the aerial vehicle 330 of the AWT, the winch drum 310 may be rotating about its central axis in one direction, and the tether 340 may be winding onto the rotating winch drum 310. The drum door 314 may be configured such that when the drum door 314 is in the open position and the drum door 314 is contacted by a portion of the main tether body 340b being wound onto the drum, the tether 340 will cause the drum door 314 to move to the closed position. For example, the winding tether 340 may push against the door and cause it to close, either exclusively from the pressure of the tether 340 against the door, or with assistance from another one or more additional mechanisms such as a compression spring, torsion spring, gas spring, motor, sensor, or other assistive device.

In a further aspect, the drum door 314 may change positions in response to different operating scenarios. For example, the drum door 314 may change positions in response to various situations such as a position of the tether 340, a position of the gimbal mount 350, a measurement from a sensor (e.g., proximity sensor, pressure sensor, etc.), or a received command.

In a further aspect, the drum door may use alternative or additional mechanisms to change positions. For example, the gimbal mount 350 may be coupled to the drum door 314 via a structural member that changes a position of the drum door based on movement of the gimbal mount 350. In a further aspect, the drum door 314 may be coupled a drive mechanism that is configured to change the drum door 314 from a first position (e.g. a closed drum door position) to a second position (e.g. an open drum door position). The drive mechanism may be a hydraulic system, a pneumatic system, or any other drive mechanism that is configured to a change position of the drum door 314.

Figure 4:
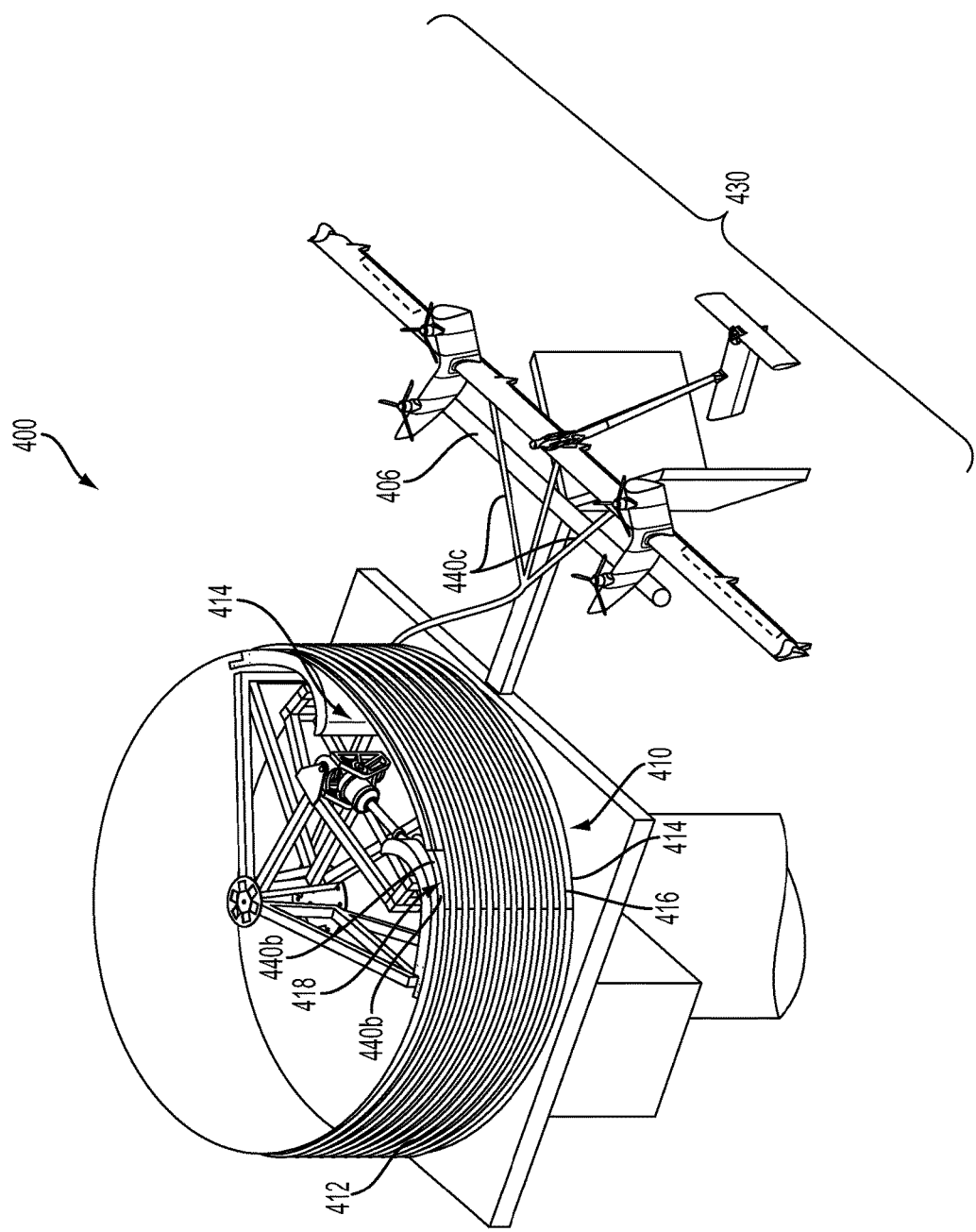
FIG. 4 illustrates a perspective view of a winch assembly and a perched aerial vehicle, according to an example embodiment.

FIG. 4 illustrates a perspective view of a winch assembly and a perched aerial vehicle, according to an example embodiment. Winch assembly 400 may be the same or similar to winch assembly 300 of FIG. 3, ground station 210 of FIG. 2, or ground station 110 of FIG. 1. FIG. 4 is representational only and not all components are shown. For example, additional structural or restraining components may not be shown.

Winch assembly may include a perch platform 406, a winch drum 410, an exterior winding surface 412, a drum door 414, a drum door exterior surface 416, a port 418, an aerial vehicle 430, and a tether 440.

As illustrated in FIG. 4 according to an example embodiment, drum door 414 may be in a closed position such that drum door 414 covers an aperture and drum door exterior surface 416 substantially corresponds to the shape of exterior winding surface 412. Tether 440 may include a proximate tether end 440a (not shown in FIG. 4), a main tether body 440b, and a distal tether end 440c. Distal tether end 440c may be coupled to perched aerial vehicle 430. When the aerial vehicle 430 is perched, the majority of the main tether body 440b may be wound around the exterior winding surface 412 of the winch drum 410 and the drum door exterior surface 416. The port 418 may provide access to an interior drum cavity for a portion of the main tether body 440b. In an example embodiment, the proximate tether end 440a may be coupled to a gimbal mount 450 inset into the interior drum cavity.

Figure 5B:
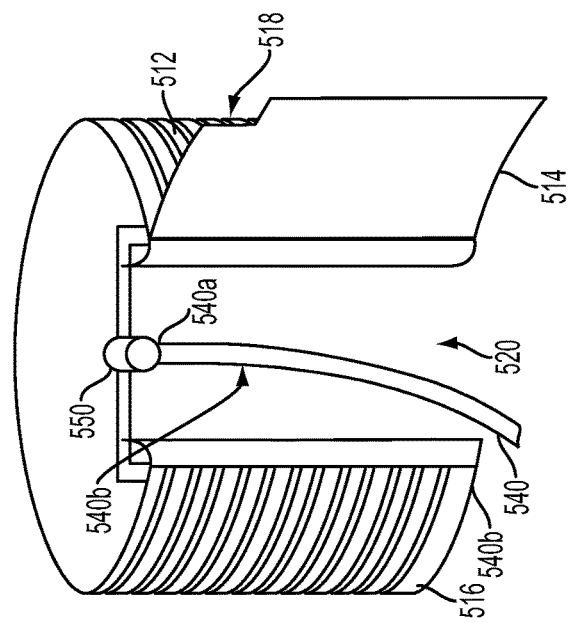
FIG. 5B illustrates a perspective view of a winch drum and drum door with the drum door in an open position, according to an example embodiment.
Figure 5A:
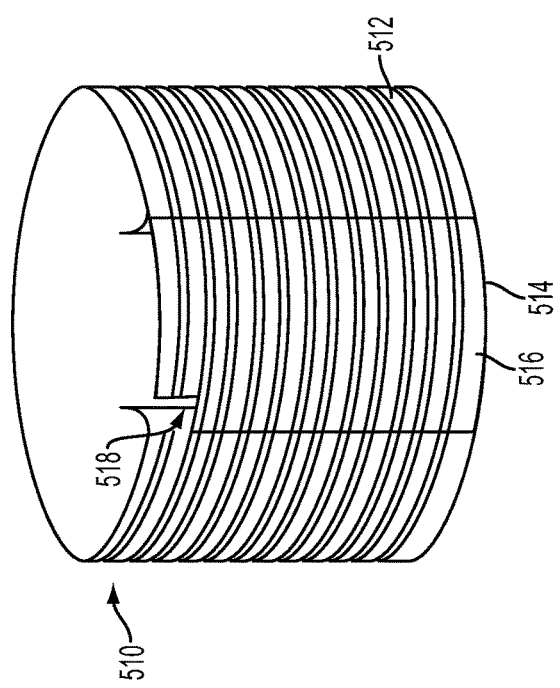
FIG. 5A illustrates a perspective view of a winch drum and drum door with the drum door in a closed position, according to an example embodiment.

FIG. 5A illustrates a perspective view of a winch drum and drum door with the drum door in a closed position, according to an example embodiment. FIG. 5B illustrates a perspective view of a winch drum and drum door with the drum door in an open position, according to an example embodiment. The components described for FIGS. 5A and 5B may be the same or similar to, and may operate in the same manner or similar to, the components previously described. For example, winch drum 510 may be the same or similar to, and may operate in the same manner or similar to, winch drum 310. FIGS. 5A and 5B are representational only and not all components are shown. For example, additional structural or restraining components may not be shown.

As illustrated in FIG. 5A, a drum door 514 may be in a closed position such that a drum door exterior surface 516 substantially corresponds to the shape of an exterior winding surface 512 of a winch drum 510, both in profile and in cross-section. A majority of a main tether body 540b may be wound about the exterior winding surface 512 of a winch drum 510 and the drum door exterior surface 516. A proximate tether end (not shown) may have access to an interior drum cavity through port 518.

As illustrated in FIG. 5B, a drum door 514 may be in an open position such that an aperture 520 through the exterior winding surface 512 of the winch drum 510 is revealed. Tether 540 may have a proximate tether end 540a that is coupled to a gimbal mount 550. The gimbal mount 550 may be coupled to winch drum 510 via a structural member. Tether 440 may have a main tether body 540b extending outside of the winch drum 510 towards a distal tether end 540c (not shown). Distal tether end 540c may be coupled to an aerial vehicle of an AWT.

Figure 6B:
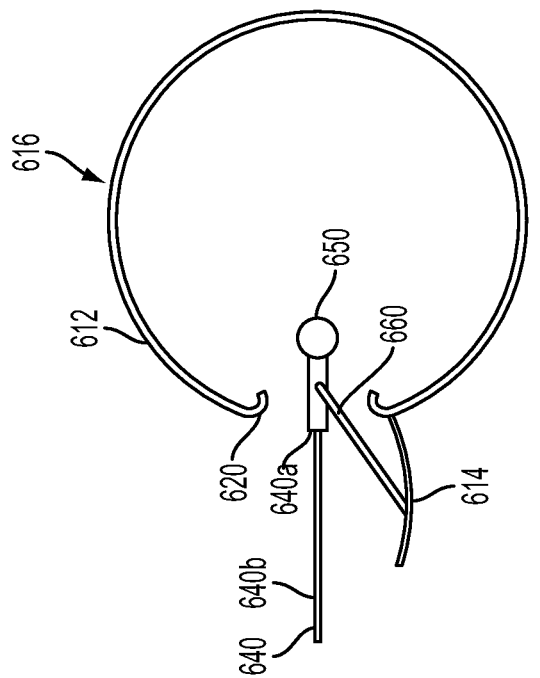
FIG. 6B illustrates a top view of a winch drum and drum door with the drum door in an open position, according to an example embodiment.
Figure 6A:
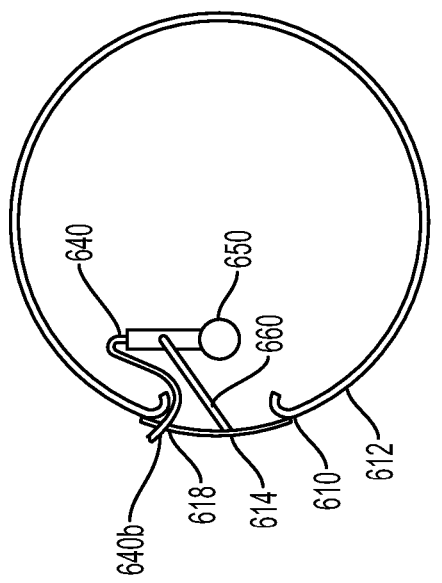
FIG. 6A illustrates a top view of a winch drum and drum door with the drum door in a closed position, according to an example embodiment.

FIG. 6A illustrates a top view of a winch drum and drum door with the drum door in a closed position, according to an example embodiment. FIG. 6B illustrates a top view of a winch drum and drum door with the drum door in an open position, according to an example embodiment. The components described for FIGS. 6A and 6B may be the same or similar to, and may operate in the same manner or similar to, the components previously described. For example, winch drum 610 may be the same or similar to, and may operate in the same manner or similar to, winch drum 310. FIGS. 5A and 5B are representational only and not all components are shown. For example, additional structural or restraining components may not be shown.

As illustrated in FIG. 6A, a drum door 614 may be in a closed position such that a drum door exterior surface 616 substantially corresponds to the shape of an exterior winding surface 612 of a winch drum 610. A majority of a main tether body 640b may be wound about the exterior winding surface 612 of a winch drum 610 and the drum door exterior surface 616. A proximate tether end 640a may have access to an interior drum cavity through port 618. Gimbal mount 650 may be coupled to drum door 614 via a structural member 660. Structural member 660 may include one or more components. For example, structural member may be a single bar or may include multiple members. Structural member 660 may be configured to change the position of the drum door 614 based on the position of the gimbal mount 650. For example, during deployment of an aerial vehicle of an AWT, the tether may be unwinding and be under tension. Near completion of deployment, tether main body 640b may substantially unwrap from exterior winding surface 612. The tensioned tether 640 may then act as a load on the gimbal mount 650 and cause the gimbal mount 650 to move. Structural member 660 may be configured such that the movement of the gimbal mount 650 causes the drum door 614 to move from a closed position to an open position. For example, the tensioned tether 640 may pull on the gimbal mount 650 and thus open the drum door 614.

As illustrated in FIG. 6B, a drum door 614 may be in an open position such that an aperture 620 through an exterior winding surface 612 is revealed. Tether 640 may have a proximate tether end 640a that is coupled to a gimbal mount 650. The gimbal mount 650 may be coupled to winch drum 610 via a structural member (not shown). Tether 640 may have a main tether body 640b extending outside of the winch drum 610 towards a distal tether end (not shown). Distal tether end may be coupled to an aerial vehicle of an AWT. Additional structural member 660 may be coupled to the drum door 614 and the gimbal mount 650 and configured to change the position of the drum door 614 based on the position of the gimbal mount 650. For example, an AWT may start a retrieval process and, as previously described, winch drum 610 may begin to rotate about a central axis and wind tether 640 onto an exterior winding surface 612 of winch drum 610. The gimbal mount 650 may be configured to change positions as the tether 640 begins to wind onto the winch drum 610. For example, the gimbal mount 650 may rotate from a position normal to the drum rotation axis and partially extended from the drum cavity to a position naturally aligned with the exterior winding surface and fully enclosed within the drum cavity. Structural member 660 may be configured to change the position of the drum door 614 from an open position to a closed position based on the movement of the gimbal mount 650 during the retrieval process. For example, structural member 660 may pull the drum door 614 closed as the gimbal mount 650 moves into the drum cavity.

Figure 7A:
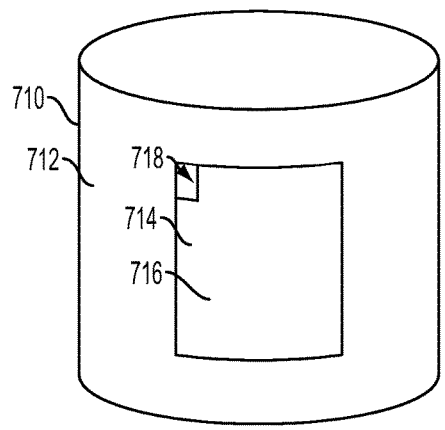
FIG. 7A illustrates a perspective view of a winch drum and drum door with the drum door in a closed position, according to an example embodiment.
Figure 7B:
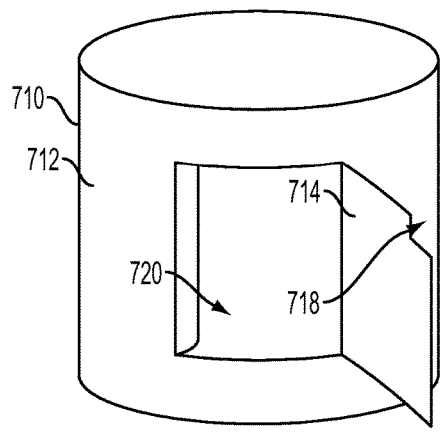
FIG. 7B illustrates a perspective view of a winch drum and drum door with the drum door in an open position, according to an example embodiment.

FIG. 7A illustrates a perspective view of a winch drum and drum door with the drum door in a closed position, according to an example embodiment. FIG. 7B illustrates a perspective view of a winch drum and drum door with the drum door in an open position, according to an example embodiment. The components described for FIGS. 7A and 7B may be the same or similar to, and may operate in the same manner or similar to, the components previously described. For example, winch drum 710 may be the same or similar to, and may operate in the same manner or similar to, winch drum 310. FIGS. 7A and 7B are representational only and not all components are shown. For example, additional structural or restraining components may not be shown.

FIG. 7A illustrates an alternative embodiment of a drum door 714 that does not extend the entire height H of the winch drum, where the drum door 710 is in a closed position. As previously described, drum door 714 may have a drum door exterior surface 716 that has substantially the same shape and profile of the surrounding exterior winding surface 712 of the winch drum 710. A port 718 may be used to allow access to an interior drum cavity.

FIG. 7B illustrates an alternative embodiment of a drum door 714 that does not extend the entire height H of the winch drum, where the drum door 710 is in an open position. As previously described, drum door 714 in an open position may reveal an aperture 720.

Figure 8A:
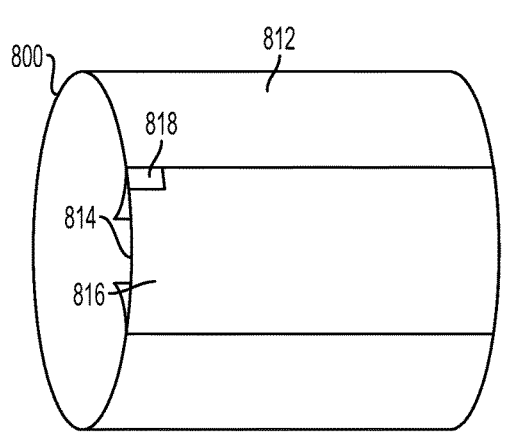
FIG. 8A illustrates a perspective view of a horizontal winch drum and drum door with the drum door in a closed position, according to an example embodiment.
Figure 8B:
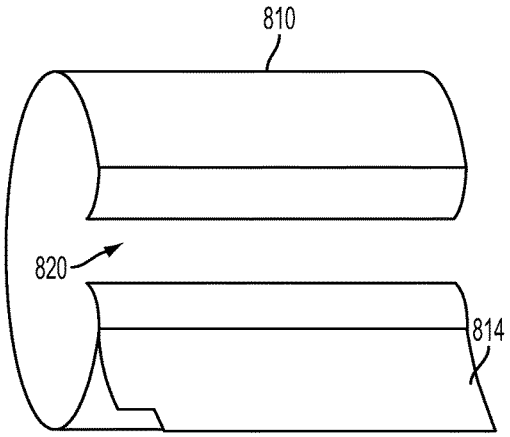
FIG. 8B illustrates a perspective view of a horizontal winch drum and drum door with the drum door in an open position, according to an example embodiment.

FIG. 8A illustrates a perspective view of a horizontal winch drum and horizontal drum door with the drum door in a closed position, according to an example embodiment. FIG. 8B illustrates a perspective view of a horizontal winch drum and horizontal drum door with the drum door in an open position, according to an example embodiment. The components described for FIGS. 8A and 8B may be the same or similar to, and may operate in the same manner or similar to, the components previously described. For example, winch drum 810 may be the same or similar to, and may operate in the same manner or similar to, winch drum 310. FIGS. 8A and 8B are representational only and not all components are shown. For example, additional structural or restraining components may not be shown.

FIG. 8A illustrates a horizontal winch drum 810 and a horizontal drum door 814 coupled to the horizontal winch drum 810, where the horizontal drum door 814 is in a closed position. Drum door 814 may have a drum door exterior surface 816 that has substantially the same shape and profile of the surrounding exterior winding surface 812 of the winch drum 810. A port 818 may be used to allow access to an interior drum cavity.

FIG. 8B illustrates an alternative embodiment of a horizontal winch drum 810 and a horizontal drum door 814, where the horizontal drum door 814 is in an open position. As previously described, drum door 814 in an open position may reveal an aperture 820.

Figure 9B:
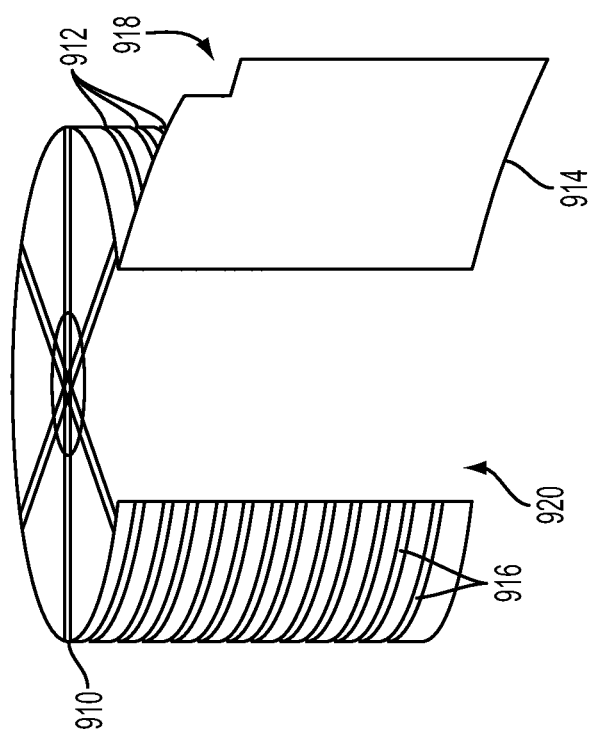
FIG. 9B illustrates a perspective view of a winch drum with helical grooves and a drum door with helical grooves and with the drum door in an open position, according to an example embodiment.
Figure 9A:
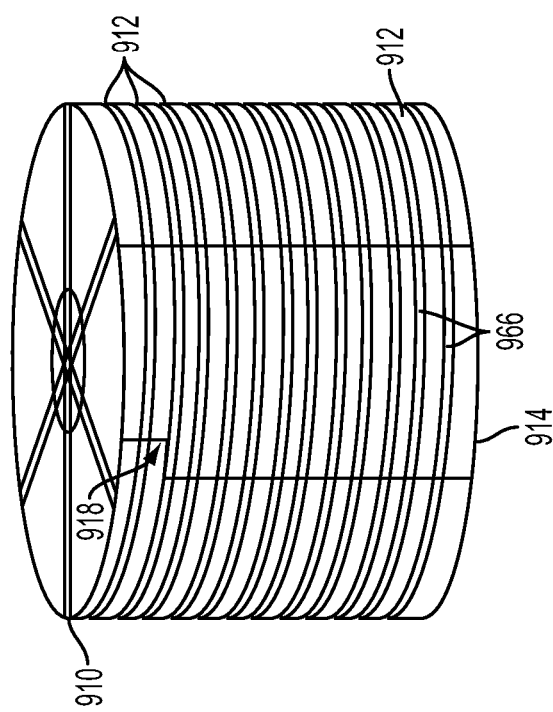
FIG. 9A illustrates a perspective view of a winch drum with helical grooves and a drum door with helical grooves and with the drum door in a closed position, according to an example embodiment.

FIG. 9A illustrates a perspective view of a winch drum, according to an example embodiment. The winch drum and drum door may have helical grooves and the drum door may be in a closed position. FIG. 9B illustrates a perspective view of a winch drum, according to an example embodiment. The winch drum and drum door may have helical grooves and the drum door may be in an open position. The components described for FIGS. 9A and 9B may be the same or similar to, and may operate in the same manner or similar to, the components previously described. For example, winch drum 910 may be the same or similar to, and may operate in the same manner or similar to, winch drum 910. FIGS. 9A and 9B are representational only and not all components are shown. For example, additional structural or restraining components may not be shown.

FIG. 9A illustrates a winch drum 910 with an exterior winding surface including helical grooves 912. Drum door 914 may have substantially the same shape and profile as the exterior winding surface, including both the same substantial profile or curvature, and helical grooves 966 that substantially match the depth, spacing, profile, orientation, and path of helical grooves 912. Drum door 914 is shown in a closed position. A port 918 may be used to allow access to an interior drum cavity.

FIG. 9B illustrates the winch drum 910 with the drum door 914 in an open position. As previously described, drum door 914 in the open position may reveal an aperture 920.

Figure 10B:
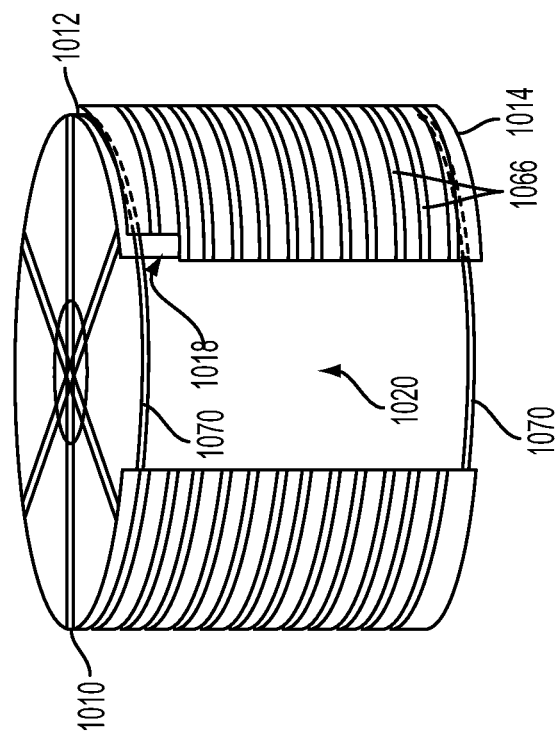
FIG. 10B illustrates a perspective view of a winch drum and a drum door with the drum door in an open position, according to an example embodiment.
Figure 10A:
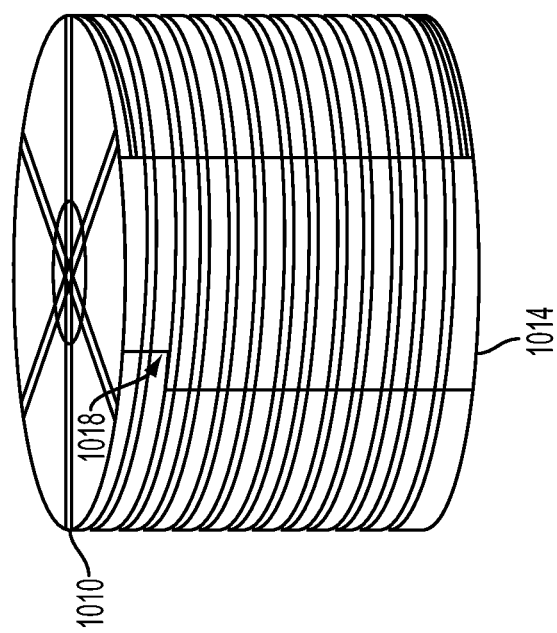
FIG. 10A illustrates a perspective view of a winch drum and a drum door with the drum door in a closed position, according to an example embodiment.

FIGS. 10A and 10B illustrates a perspective view of a drum door 1014 configured to change positions by sliding, according to an example embodiment. FIG. 10A illustrates a perspective view of a winch drum 1010 and a drum door 1014 in a closed position. FIG. 10B illustrates a perspective view of a winch drum 1010 and a drum door 1014 with the drum door in an open position. FIGS. 10A and 10B are representational only and not all components are shown. For example, additional structural or restraining components may not be shown.

As shown in FIGS. 10A and 10B, a track 1070 may be coupled to the drum door 1014. The track 1070 may allow the drum door to slide open to reveal an aperture 1020. A port 1018 may be used to allow access to an interior drum cavity. A drive mechanism 1080 may be used to change the position of the drum door as previously described (e.g., a hydraulic system, a pneumatic system, etc.). In a further aspect, the position of the drum door may change based on various items as previously described (e.g., position of the gimbal, sensor measurement, position of the tether, etc.)

D. Illustrative Methods

Figure 11:
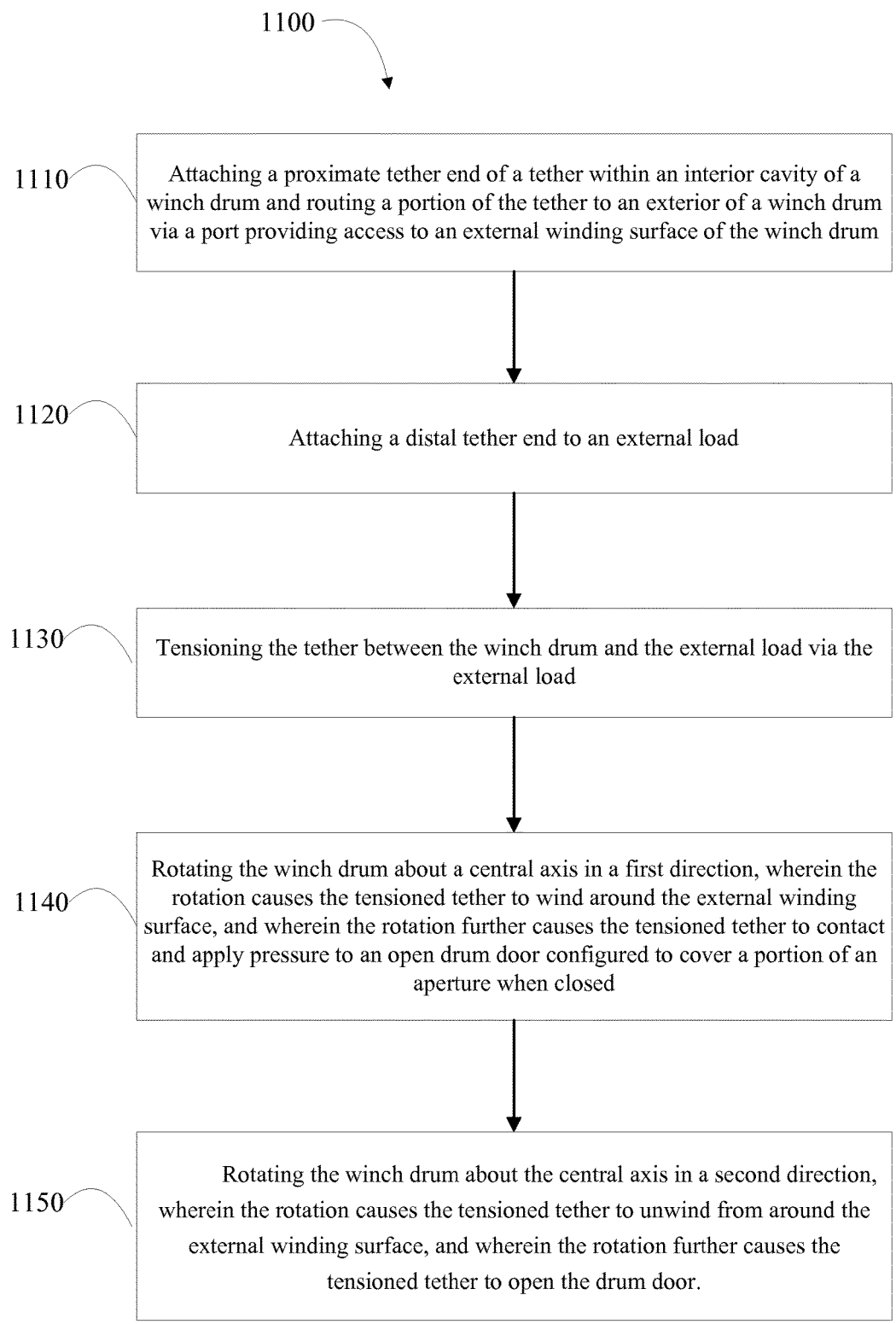
FIG. 11 is a flowchart of a method, according to an example embodiment.

FIG. 11 is a flowchart of a method, according to an example embodiment. Illustrative methods, such as method 1100, may be carried out in whole or in part by a component or components of an aerial vehicle system, such as by the one or more components of the winch assembly 300 of FIG. 3, the winch drums described in reference to FIGS. 1 through 10, and the drum doors described in reference to FIGS. 1 through 10. For instance, method 1100 may be performed by winch assembly 300 along with control system 248. For simplicity, method 1100 may be described generally as being carried out by a winch assembly, such as winch assembly 300. However, it should be understood that example methods, such as method 1100, may be carried out by other entities or combinations of entities without departing from the scope of the disclosure.

Method 1100 may be used to change a position of a drum door from an open position to a closed position, and from a closed position to an open position, based on a tether contacting or acting on a drum door. At block 1110, a tether end may be positioned within an interior cavity of a winch drum and the tether may be routed to an exterior of the winch drum via a port that may provide access to an external winding surface of a drum. At block 1120, a distal tether end may be attached to an external load, such as an aerial vehicle. At block 1130, the tether may be tensioned between the winch drum and the external load via the external load. At block 1140, the winch drum may be rotated about a central axis in a first direction. The rotation of the winch drum may cause the tensioned tether to wind around the external winding surface. Additionally, the rotation of the winch drum may cause the tensioned tether to contact and apply pressure to an open drum door and to close the open drum door. The drum door may cover an aperture in the external winding surface. At block 1150, the winch drum may be rotated about a central axis in a second direction. The rotation of the winch drum may cause the tensioned tether to unwind from around the external winding surface. The further rotation of the winch drum may cause the tensioned tether to open the door.

CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A winch assembly, comprising:
   a drum, rotatable about a central axis, comprising:
   an exterior winding surface having an aperture through the exterior winding surface; and
   a drum door comprising:
   a drum door exterior surface; and
   a port, wherein the drum door is configured for at least two positions: (i) a closed drum door position covering the aperture, wherein the shape of the drum door exterior surface substantially corresponds to the shape of the exterior winding surface surrounding the aperture, and (ii) an open drum door position revealing the aperture, wherein the port is configured to provide access to an interior drum cavity and to allow a first portion of a main tether body to exit the interior drum cavity via the port;
   a tether comprising a proximate tether end, the main tether body, and a distal tether end, wherein the proximate tether end is located within the interior drum cavity; and
   a gimbal mount attached to the drum, wherein the gimbal mount constrains a second portion of the main tether body,
   wherein the drum is configured such that rotating the drum about the drum's central axis in a first direction causes the main tether body to wind onto the drum and rotating the drum about the drum's central axis in a second direction causes the main tether body to unwind from the drum, wherein the drum door is in the closed position and the tether is not wound around the drum, and wherein the gimbal mount and the second portion of the main tether body are disposed and oriented within the interior drum cavity in proximity to the drum door such that when tension is applied to the distal end of the tether, the tensioned tether will push against the drum door causing the drum door to move from the closed position to the open position.

2. The winch assembly of claim 1, wherein the exterior winding surface and the drum door exterior surface comprise helical grooves, and wherein the exterior surface and the drum door exterior surface are configured to create a substantially continuous helical groove pattern when the drum door is in the closed position.

3. The winch assembly of claim 1, wherein the gimbal mount is attached to a structural member of the drum.

4. The winch assembly of claim 1, wherein the gimbal mount is configured to be in the interior drum cavity when the drum door is in the closed drum door position.

5. The winch assembly of claim 1, wherein the tether comprises at least one conductor.

6. A winch assembly, comprising:
   a drum, rotatable about a central axis, comprising:
   an exterior winding surface having an aperture through the exterior winding surface; and
   a drum door comprising:
   a drum door exterior surface; and a port, wherein the drum door is configured for at least two positions: (i) a closed drum door position covering the aperture, wherein the shape of the drum door exterior surface substantially corresponds to the shape of the exterior winding surface surrounding the aperture, and (ii) an open drum door position revealing the aperture, wherein the port is configured to provide access to an interior drum cavity and to allow a first portion of a main tether body to exit the interior drum cavity via the port;

a tether comprising a proximate tether end, the main tether body, and a distal tether end, wherein the proximate tether end is located within the interior drum cavity; and a gimbal mount attached to the drum, wherein the gimbal mount constrains a second portion of the main tether body, wherein the drum is configured such that rotating the drum about the drum's central axis in a first direction causes the main tether body to wind onto the drum and rotating the drum about the drum's central axis in a second direction causes the main tether body to unwind from the drum, wherein the drum door is in the open position and the tether is not wound around the drum, and wherein the drum door is configured such that when the drum is rotated in the first direction, the tether winding onto the drum will push against the drum door causing the drum door to move to the closed position.

7. A system, comprising:

an aerial vehicle;

a drum, rotatable about a central axis, comprising:
  an exterior winding surface having an aperture through the exterior winding surface; and
  a drum door comprising:
    a drum door exterior surface; and
    a port, wherein the drum door is configured for at least two positions: (i) a closed drum door position covering the aperture, wherein the shape of the drum door exterior surface substantially corresponds to the shape of the exterior winding surface surrounding the aperture, and (ii) an open drum door position revealing the aperture, wherein the port is configured to provide access to an interior drum cavity and to allow a first portion of a main tether body to exit the interior drum cavity via the port;

a tether comprising a proximate tether end located within the interior drum cavity, the main tether body, and a distal tether end connected to the aerial vehicle;

a gimbal mount attached to the drum, wherein the gimbal mount constrains a second portion of the main tether body; and a drum drive assembly attached to the drum, comprising: (i) a motor, and (ii) a drum drivetrain connected to the motor and the drum, wherein the drum drive assembly is configured to rotate the drum, wherein the drum is configured such that rotating the drum about the drum's central axis in a first direction causes the main tether body to wind onto the drum and rotating the drum about the drum's central axis in a second direction causes the main tether body to unwind from the drum, wherein the drum door is in the closed position and the tether is not wound around the drum, and wherein the gimbal mount and the second portion of the main tether body are disposed and oriented within the interior drum cavity in proximity to the drum door such that when tension is applied to the distal end of the tether via the aerial vehicle, the tensioned tether will push against the drum door causing the drum door to move from the closed position to the open position.

8. The system of claim 7, wherein the exterior winding surface and the drum door exterior surface comprise helical grooves, and wherein the exterior winding surface and the drum door exterior surface are configured to create a substantially continuous helical groove pattern when the drum door is in the closed position.

9. The system of claim 7, wherein the tether comprises at least one insulated electrical conductor.

10. A system, comprising:

an aerial vehicle;

a drum, rotatable about a central axis, comprising:
  an exterior winding surface having an aperture through the exterior winding surface; and
  a drum door comprising:
    a drum door exterior surface; and
    a port, wherein the drum door is configured for at least two positions: (i) a closed drum door position covering the aperture, wherein the shape of the drum door exterior surface substantially corresponds to the shape of the exterior winding surface surrounding the aperture, and (ii) an open drum door position revealing the aperture, wherein the port is configured to provide access to an interior drum cavity and to allow a first portion of a main tether body to exit the interior drum cavity via the port;

a tether comprising a proximate tether end located within the interior drum cavity, the main tether body, and a distal tether end connected to the aerial vehicle;

a gimbal mount attached to the drum, wherein the gimbal mount constrains a second portion of the main tether body; and a drum drive assembly attached to the drum, comprising: (i) a motor, and (ii) a drum drivetrain connected to the motor and the drum, wherein the drum drive assembly is configured to rotate the drum, wherein the drum is configured such that rotating the drum about the drum's central axis in a first direction causes the main tether body to wind onto the drum and rotating the drum about the drum's central axis in a second direction causes the main tether body to unwind from the drum, wherein the drum door is in the open position and the tether is not wound around the drum, and wherein the drum door is configured such that when the drum is rotated in the first direction, the tether winding onto the drum will push against the drum door causing the drum door to move to the closed position.

* * * * *